United States Patent

[11] 3,595,349

[72] Inventor Johannes Ortheil
    Anrath, Germany
[21] Appl. No 818,345
[22] Filed Apr. 22, 1969
[45] Patented July 27, 1971
[73] Assignee Langen & Company
    Dusseldorf, Germany
[32] Priority May 17, 1968
[33] Germany
[31] P 17 50 610.4

[54] REGULATED HYDRO-PNEUMATIC STRUT
    4 Claims, 1 Drawing Fig.
[52] U.S. Cl............................................. 188/289,
    267/8 A, 267/DIG. 1
[51] Int. Cl........................................ F16f 9/24
[50] Field of Search........................188/88.509,
    88.510, 96.9; 267/8 A, DIG. 1

[56] References Cited
    UNITED STATES PATENTS
    713,691  11/1902  Schneider et al. ............ 188/96.9

2,332,520  10/1943  Lucht........................... 188/96.9
3,461,991   8/1969  Arendarski................. 188/88 (.509)
            FOREIGN PATENTS
817,090    11/1951  Germany..................... 188/88 (.509)
943,294    12/1963  Great Britain................ 267/CH Primary Examiner—George E. A. Halvosa
Attorney—Holman & Stern ABSTRACT: A level regulated hydropneumatic strut or like component in which a piston-cylinder assembly and a hydroreservoir or accumulator connected to the piston space is so constructed and arranged that the flow paths between the piston space, the annular space or the space surrounding the piston rod and the reservoir are throttled increasingly, viewed from the level position, upon elastic deflections of the piston as a function of the movement path of the piston.

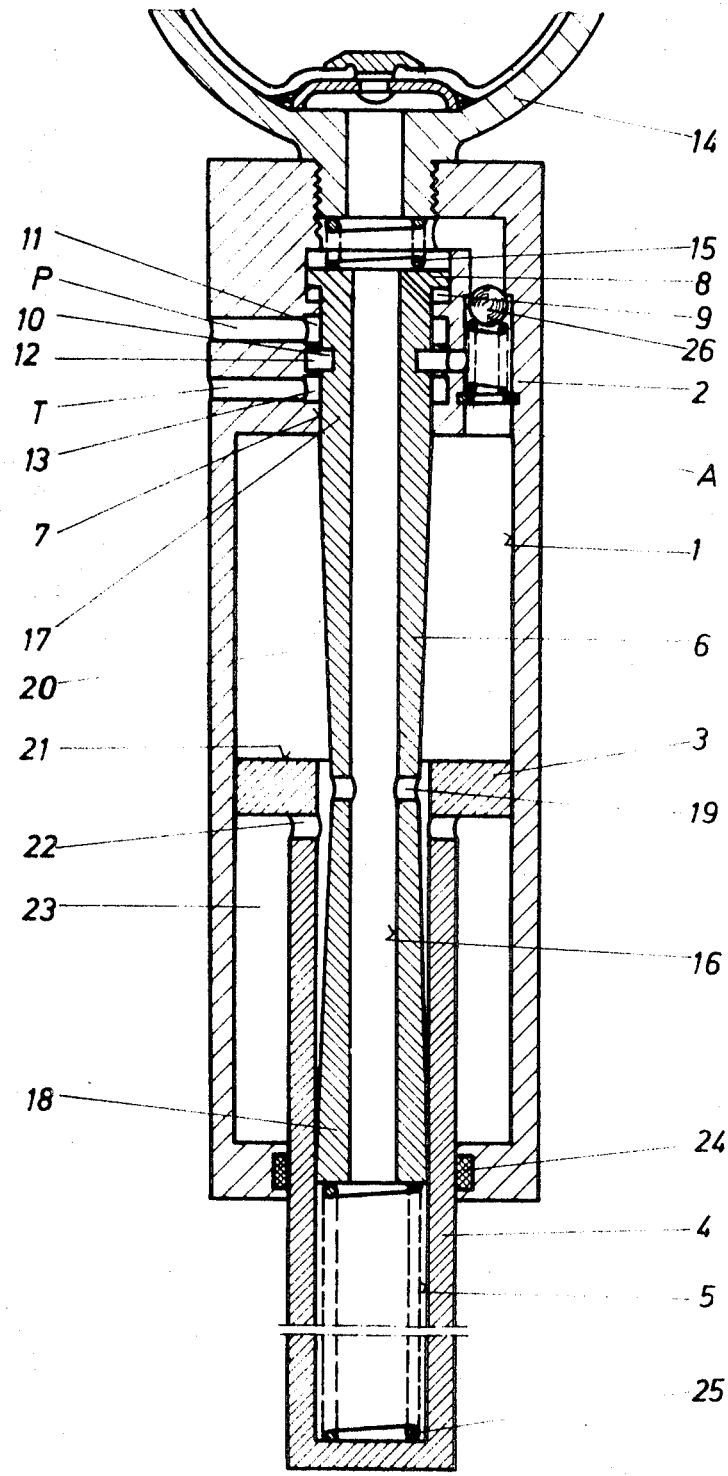

REGULATED HYDRO-PNEUMATIC STRUT

BACKGROUND OF THE INVENTION

It is already known in the prior art to provide a strut and attention is invited to German Pat. No. 1,058,854 in which the stroke of a plunger type piston is damped upon retraction as a function of the path of movement, and the damping is accomplished by bores offset axially in the wall of the cylinder with the bores being closed by the pistons, by virtue of which the effective cross section of the flow is reduced. This particular structural design is disadvantageous in that the damping increases only stepwise, and in addition, it is necessary to provide the outer circumference or perimeter of the cylinder or the cylinder wall with conduction means for the onward conduction or leading of the fluid which has flowed through the bores. Of course, this increases the space requirement for mounting in a particularly undesirable manner and a further disadvantage is that the damping dependent upon the path, viewed from the level position, is effective only in one direction.

SUMMARY OF THE PRESENT INVENTION

It is an object of this invention to overcome the above and other disadvantages existing in the prior art and to provide a strut of the type under consideration which, without an increased space requirement, possesses a damping characteristic which increases continuously to both sides viewed from the level position.

The present invention solves the problem in that the piston rod is provided with an axially extending bore in which plunges or moves in a sealing manner a tube attached to the housing of the cylinder with the tube tapering from both ends thereof towards its center portion over part of its length and presenting at the point of least diameter transverse bores which communicate with the interior of the tube which functions as a connection with the hydroreservoir or accumulator, the transverse bores lying, in the level position of the piston, in the area between the piston surface and a transverse bore connecting the annular space or space surrounding the piston rod with the bore in the piston rod.

In a particularly efficacious embodiment of the invention, the tube may, for the purpose providing a level control device lying within the housing of the cylinder, be movable within the housing between two stops or abutments and may, at that point, in combination with bores and/or annular grooves in the housing, be so designed that the results the operation of a three 3-way level control valve centered by two oppositely operative springs in the level position of the piston in its blocking position, with the tube being braced via one spring against the housing of the cylinder and via the other spring against the closed end of the piston rod.

Further object and advantages of the invention will become more readily apparent to persons skilled in the art from the following detailed description and annexed drawing:

DETAILED DESCRIPTION OF THE DRAWINGS

The sole FIGURE is a fragmentary view in axial cross section of a strut embodying the present invention with the strut being illustrated in its level position.

DETAILED DESCRIPTION OF THE INVENTION

As shown in the drawings there is provided a cylinder housing 2 provided with an axially extending bore 1 and a slidably mounted piston 3 having a hollow piston rod 4. The piston rod 4 is provided with an axial bore 5 into which a tube denoted generally 6 is adapted to plunge or move. The tube 6 is additionally guided in a second bore 7 of lesser diameter than the bore 1 in the housing 2 and the bore 7 is coaxial with the bore 1. The tube 6 is formed with a collar or shoulder 8 at its upper end and the collar 8 coacts with an annular groove provided in the housing 2 which surrounds the bore 7 in order that the tube 6 can have or execute a small stroke.

It will further be noted that the tube 6 is formed with an annular groove 10 with the groove 10 cooperating with corresponding axially spaced annular grooves 11, 12 and 13 in the housing 2 to constitute a three 3-way level control valve means.

It will be noted that the upper end of the bore 7 of housing 2 is provided with an internal thread for receiving an external thread provided on a neck portion of a hydroreservoir or accumulator 14. A coil spring 15 is biased between the end of the neck portion of the reservoir 14 and the upper surface of the collar or shoulder 8.

The tube 6 is formed with a through bore 16 and the perimeter or outer surface of the tube 6 includes two cylindrical portions 17&18 respectively and from which portions the tube tapers towards its center area. At the point of smallest diameter, the tube 6 is provided with a transverse bore 19 and in the level position of the piston 3, the bore 19 lies approximately in the zone between piston face 21 directed towards piston space 20 and a transverse bore 22 formed in the piston rod 4 adjacent the piston 3. The bore 22 provides communication between an annular space 23 or the space surrounding the piston rod 4 and the bore 5 within the piston rod. A packing 24 seals the annular space 23 from the surrounding atmosphere.

A coil spring 25 positioned within the bore 5 is biased between the closed end of the piston rod 4 and the lower end of the tube 6. A check valve 26 such as a spring loaded ball allows the unhindered return flow from the reservoir 14 into the piston space 20.

While the operation of the invention is believed to be apparent from the foregoing description, it may be summarized as follows:

In the position illustrated, the piston 3 is in its level position and the springs 15 and 25 acting on the opposite ends of the tube 6 are in equilibrium and are so correlated that the tube 6 occupies a location in which the annular groove 12 connected by way of connection A with the piston space 20 is separated from both the annular groove 11 connected with a pressure connection P as well as from the annular groove 13 connected with a tank connection or drain T.

The transverse bore 19 is present in the area between the piston face 21 and the transverse bore 22 so that the full cross section from the piston zone 20 or from the annular space 23 to the transverse bore 19, respectively has its maximum value. Upon the inward movement of the piston 3 caused, for example, by an irregularity existing in the road surface, initially liquid is displaced substantially unthrottled from the piston space 20 via the bore 5 and transverse bore 22 into the annular space 23 or via the bore 5, bore 19, bore 16 and bore 17 into the reservoir or accumulator, respectively. At increasing stroke, due to the coincity of the tube 6, the gap or hiatus between the outer surface of the tube 6 and the piston 3 becomes smaller and as a consequence, the resistance to flow becomes greater. When the piston 3 approaches the cylindrical portion 17 of the tube 6 and finally reaches such portion, the flow resistance is so great that it must be equated with a hydraulic abutment. Simultaneously with this process, the spring 25 is subjected to more compression and due to this action, the force of the spring 25 increases beyond the force of the spring 15 whereby the tube 6 is displaced accordingly.

The annular groove 10 in the tube 6 connects the annular groove 12 with the annular groove 11 and hence the pressure connection P with the piston space. Under static load variations, for example, due to added or increased loading, the liquid then flows into the piston space 20 until the piston 3 has again attained its level position. By a proper design of the annular grooves 10—13 it is possible to achieve that under static load variations, the level regulation is effected whereas at rapid dynamic load variations, the level regulation does not become operative.

The spring movements in the piston 3 which exceed the possible stroke of the tube 6 are absorbed by the spring 25 and during a subsequent outward movement, initially liquid is displaced from the reservoir 14 or from the annular space 23 into the piston space 20 at decreasing damping, respectively. After the level position has been passed, the damping again increases due to the fact that the gap or hiatus between the bore 22 and the tube 6 becomes increasingly smaller with further elastic extension. The resistance to flow between the annular space 23 and the piston space 20 increases accordingly and when finally the transverse bore 22 is closed by the cylindrical portion 18, there again results the hydraulic abutment herein above described.

Upon elastic tension beyond the level position, the force of the spring 15 predominates over the force of the spring 25 and the tube 6 is so displaced that the annular grooves 12 and 13 are connected by means of the annular groove 10. If the elastic tension is effected statically, the liquid flows until the piston 3 has again reached its level position. Dynamic tensions have, as has been explained practically no effect.

At variance with the embodiment illustrated in the drawing, it is, of course, possible to vary or alter the coincity of the tube 6. For example, it may be desirable to damp movements in the vicinity of the level position, not as a function of the movement path. In this situation, the tube 6 may be provided approximately in its center zone with a cylindrical portion which in this area causes no, or at least a constant, damping.

Moreover, it is possible to provide between the reservoir or accumulator 14 and the bore 7 for the development of the basic dampening, a double-acting throttle valve known per se. Finally, it is clear that the annular grooves 11, 12, and 13 serving as level control valve means in connection with annular groove 10 of tube 6 may be differently arranged or replaced by bores so long as the desired three 3-way operation is maintained or preserved.

The taper may, as illustrated, be conical or it may be designed in another suitable form. When the piston movement is strongly damped, it is advantageous to install one or more valves 26 since the return time of piston 19 to its level position can then be shortened. Naturally, the type and installation of the check valve 26 are elective in accordance with the problems to be solved.

I claim:

1. A level-regulated hydropneumatic strut including a cylinder having a housing, a piston and piston rod within the housing dividing the interior thereof into a piston space and an annular space, respectively, a hydroreservoir connected to the interior of the housing, and means for providing communication between the piston space, the annular space and the hydroreservoir being increasingly throttled, viewed from the level position of the piston upon elastic deflection of the piston dependent upon the path of the piston, the improvement being said piston rod having an axially extending bore, a tube attached to the cylinder housing extending through the piston into the bore of the piston rod in a sealing manner, said tube having its outer periphery tapering over part of its length at both ends toward the center thereof, said tube, at its area of smallest diameter being provided with a transverse bore, said piston rod having a transverse bore for connecting the annular space with the axial bore of the piston rod, the transverse bore of said tube lying, in the level position of the piston in the area between the surface of the piston facing the piston space and the transverse bore in the piston rod, first spring means biased between the cylinder housing at one end of the tube, second spring means biased between the other end of the tube and the piston rod, said cylinder housing having two axially spaced abutments between which said tube is movable, a pressure connection, a drain connection, said cylinder housing in the area of said abutments having a plurality of communication means adapted to communicate with the pressure connection, the drain connection, and the piston space respectively, and said tube having communication means for coacting with the communication means of the cylinder housing whereby providing a three 3-way level control valve which is centered by said first and second spring means at the level position of the piston, the communication means providing communication between the pressure and drain connections respectively being separated from the communication means connected with the piston space.

2. The level-regulated hydropneumatic strut as claimed in claim 1 further including a check valve within the cylinder housing between the piston space and the reservoir with the check valve opening in a direction of the piston space.

3. The level-regulated hydropneumatic strut as claimed in claim 1 in which said tube is provided with two cylindrical portion having an outer diameter corresponding to the inner diameter of the bore of the piston rod, with the cylindrical portion in the piston space, during the inwards stroke of the piston, interrupting the flow path between the piston space and the annular space or the reservoir respectively while during the outward stroke of the piston, the other cylindrical portion covers the transverse bore in the piston rod whereby hydraulic abutments are developed upon exceeding maximum stroke of the piston.

4. The level-regulated hydropneumatic as claimed in claim 2 in which the tapers of the tube are conical.